United States Patent
Bowling

(10) Patent No.: US 10,841,303 B2
(45) Date of Patent: Nov. 17, 2020

(54) APPARATUS AND METHODS FOR MICRO-SEGMENTATION OF AN ENTERPRISE INTERNET-OF-THINGS NETWORK

(71) Applicant: Bank of America Corporation, Charlotte, NC (US)

(72) Inventor: John Ryan Bowling, Mooresville, NC (US)

(73) Assignee: Bank of America Corporation, Charlotte, NC (US)

( * ) Notice: Subject to any disclaimer, the term of this patent is extended or adjusted under 35 U.S.C. 154(b) by 209 days.

(21) Appl. No.: 15/951,408

(22) Filed: Apr. 12, 2018

(65) Prior Publication Data
US 2019/0319950 A1   Oct. 17, 2019

(51) Int. Cl.
| H04L 29/00 | (2006.01) |
| H04L 29/06 | (2006.01) |
| H04L 12/24 | (2006.01) |
| H04L 29/08 | (2006.01) |

(52) U.S. Cl.
CPC .......... *H04L 63/0876* (2013.01); *H04L 41/12* (2013.01); *H04L 63/02* (2013.01); *H04L 67/12* (2013.01)

(58) Field of Classification Search
CPC ......... H04L 41/12; H04L 67/12; H04L 63/02; H04L 63/0876
See application file for complete search history.

(56) References Cited

U.S. PATENT DOCUMENTS

| 9,319,404 | B2 | 4/2016 | Svigals |
| 9,479,485 | B2 | 10/2016 | Chen |
| 9,485,231 | B1 | 11/2016 | Reese |
| 9,565,192 | B2 | 2/2017 | Chillappa et al. |
| 9,591,016 | B1* | 3/2017 | Palmieri ............. H04L 63/1433 |
| 9,699,659 | B2* | 7/2017 | Zehavi .................... H04W 4/70 |
| 9,699,814 | B2 | 7/2017 | Zakaria et al. |
| 9,716,595 | B1* | 7/2017 | Kravitz ................. H04L 9/3268 |
| 9,729,528 | B2 | 8/2017 | Zakaria et al. |
| 9,811,387 | B2 | 11/2017 | Baughman et al. |
| 9,825,921 | B2 | 11/2017 | Reese |

(Continued)

OTHER PUBLICATIONS

"Securing the Internet of Things: A Proposed Framework," https://www.cisco.com/c/en/us/about/security-center/secure-iot-proposed-framework.html, Mar. 16, 2016.

(Continued)

*Primary Examiner* — Don G Zhao
(74) *Attorney, Agent, or Firm* — Weiss & Arons LLP; Michael A. Springs, Esq.

(57) ABSTRACT

Apparatus, systems, architectures and methods for communication over an enterprise internet-of-things (EIoT) network are disclosed. Network(s) may be micro-segmented. Network segment(s) may be associated with distinct function(s). EIoT device(s) may be identified by type(s), class(es), functionality(ies), function(s) and/or security level(s). EIoT device protocol(s) may be translated/emulated. EIoT device(s) may be temporarily/permanently quarantined. Network gateway(s) may factor EIoT device/network data based on function(s) and/or specification(s). Data may be routed to network segment(s) based on associated function(s).

11 Claims, 11 Drawing Sheets

(56) References Cited

U.S. PATENT DOCUMENTS

| | | | |
|---|---|---|---|
| 9,875,510 B1 | 1/2018 | Kasper | |
| 10,251,053 B1 | 4/2019 | Paczkowski | |
| 10,484,251 B1* | 11/2019 | Gupta | H04L 67/2809 |
| 10,574,654 B1* | 2/2020 | Schroeder | H04L 63/10 |
| 2016/0028632 A1* | 1/2016 | Vasseur | H04L 12/28 |
| | | | 370/237 |
| 2016/0173495 A1 | 6/2016 | Joo | |
| 2016/0219024 A1* | 7/2016 | Verzun | H04L 63/102 |
| 2016/0248746 A1 | 8/2016 | James et al. | |
| 2016/0259937 A1 | 9/2016 | Ford et al. | |
| 2016/0260095 A1 | 9/2016 | Ford | |
| 2016/0337127 A1 | 11/2016 | Schultz et al. | |
| 2016/0366181 A1 | 12/2016 | Smith et al. | |
| 2017/0163444 A1* | 6/2017 | McLaughlin | H04L 69/08 |
| 2017/0289184 A1* | 10/2017 | C | H04L 63/1425 |
| 2018/0091516 A1* | 3/2018 | Nixon | H04L 63/20 |
| 2018/0253451 A1 | 9/2018 | Callan et al. | |
| 2018/0255152 A1* | 9/2018 | Jeuk | H04L 67/28 |
| 2018/0316655 A1* | 11/2018 | Mani | H04L 61/1511 |
| 2018/0316673 A1* | 11/2018 | Shah | H04L 63/0892 |
| 2019/0098028 A1* | 3/2019 | Ektare | H04L 43/10 |
| 2019/0103881 A1* | 4/2019 | Connor | H03M 13/373 |
| 2019/0172566 A1 | 6/2019 | Schulman et al. | |
| 2019/0289454 A1 | 9/2019 | Inoue | |
| 2019/0297078 A1* | 9/2019 | Davis, III | H04L 63/205 |
| 2019/0306242 A1* | 10/2019 | Thummalapalli | H04L 67/141 |
| 2019/0349190 A1* | 11/2019 | Smith | H04L 41/12 |
| 2019/0372938 A1* | 12/2019 | Pasdar | H04L 63/0272 |
| 2019/0373472 A1* | 12/2019 | Smith | H04L 63/20 |
| 2019/0380037 A1* | 12/2019 | Lifshitz | G06N 20/00 |
| 2020/0169951 A1* | 5/2020 | Cai | H04W 4/24 |

OTHER PUBLICATIONS

"Global Hacker Botnet tops 6 million hijacked devices," http://www.computerweekly.com/news/450427023/Global-hacker-botnet-tops-6-million-hijacked-devices, Sep. 27, 2017.

Conoscenti et al., "Peer to Peer for Privacy and Decentralized in the Internet of Things," 2017, IEEE, pp. 288-290. (Year: 2017).

* cited by examiner

APPARATUS AND METHODS FOR MICRO-SEGMENTATION OF AN ENTERPRISE INTERNET-OF-THINGS NETWORK

FIELD OF TECHNOLOGY

The embodiments set forth herein relate to enterprise internet-of-things (EIoT) apparatus. More specifically, the embodiments set forth herein relate to connecting internet-of-things (IoT) apparatus to an enterprise system network.

BACKGROUND OF THE DISCLOSURE

With the increasing prevalence of internet-of-things (IoT) devices, there is a corresponding rise in risk of malicious infiltration, such as via unsecured IoT devices, into otherwise relatively secure networks. Often IoT devices include primitive and/or archaic code that can provide hackers undetected access to connected systems and data. This is of particular concern to enterprise networks and systems where confidential data from countless employees, associates and clients may be compromised by a single malicious hacker. In addition, hackers might use unsecured IoT devices as a portal to unleash malicious code and/or other forms of cyberattacks on an enterprise system.

It is therefore increasingly crucial to develop secure platform(s) for integrating IoT devices into existing enterprise systems, architectures and/or networks in a way that reliably allows functional access of the IoT devices while simultaneously preventing intentional or unintentional malfunctions and/or malicious activity targeting the enterprise.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
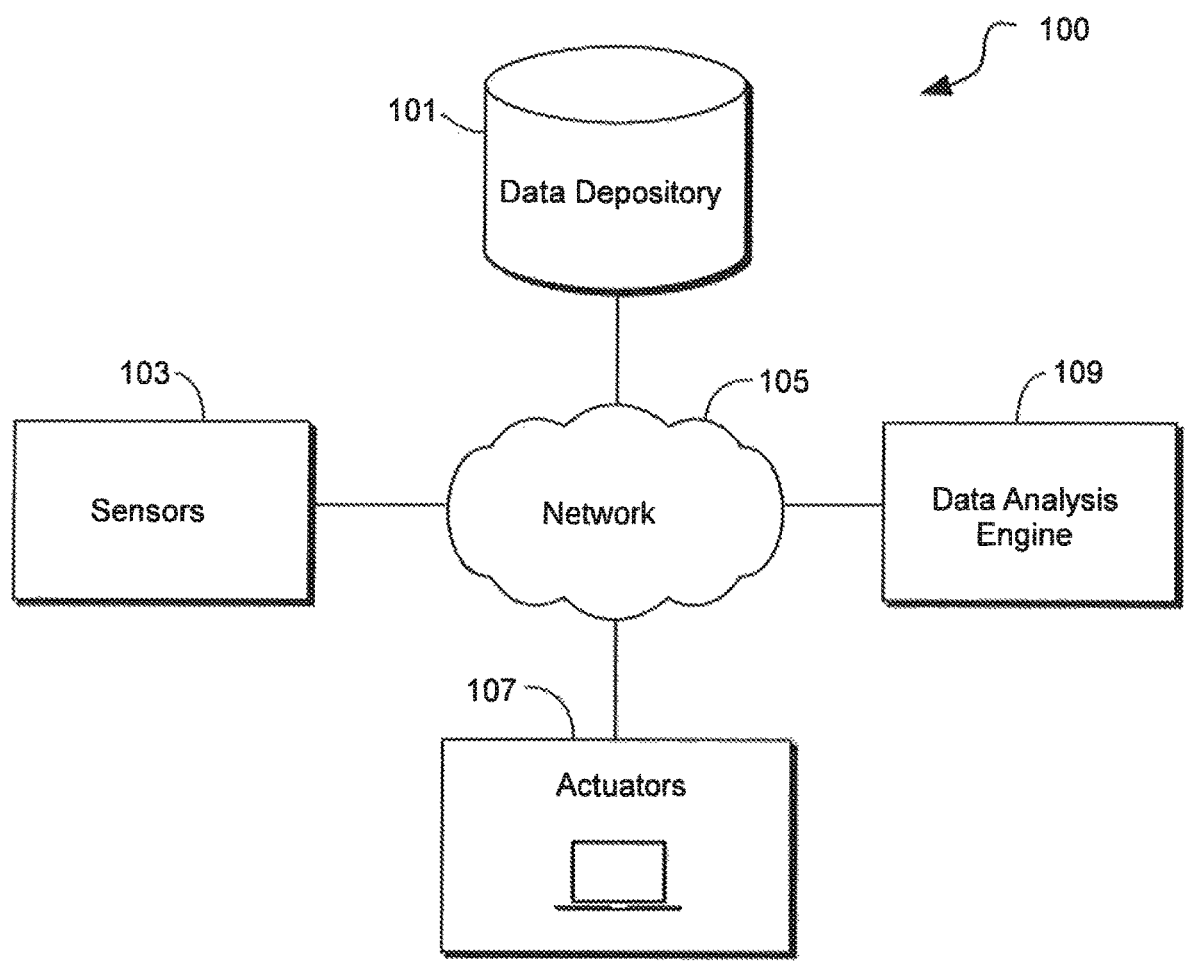
FIG. 1 is a schematic diagram of illustrative architecture in accordance with principles of the invention.

Apparatus and methods for secure integration of internet-of-things (IoT) devices into enterprise network(s) are provided.

The methods may include, and the apparatus may involve, a method of securing of one or more than one enterprise internet-of-things (IoT) network. The network(s) may include one or more than one system. The system(s) may include the network(s). The method may include network virtualization. The method may include micro-segmentation of the system(s). The micro-segmentation may include sectioning the system(s) and/or network(s) into a plurality of segments. The method may include creating protected enclave(s). The system may include one or more than one virtual network, such as virtual local area networks (VLANs) and/or virtual private networks (VPNs). The network system may include one or more than one virtual machine.

The method may include setting up one or more network firewalls. The method may include setting up one or more host firewalls. The method may involve network access control (NAC). The method may include protecting subsets of data with boundaries. The boundaries may enable predetermined IoT service(s) to access specific subset(s) of enterprise network data. IoT device(s) configured to communicate over wireless connection(s) may be restricted to one or more than one private VLAN.

The method may include simulating of network(s). The method may involve software-defined networking (SDN). The method may include using one or more VLAN protocols, such as 4095 VLANs and/or 16M VLANs. The method may include one or more than one encapsulation protocol. The encapsulation protocol may be for running one or more than one overlay network. The method may include Shortest Path Bridging (SPB). The method may involve Virtual Extensible LAN (VXLAN).

The method may include auditing IoT services for unauthorized and/or suspicious activity. Predetermined policy controls may restrict IoT device(s) network access. The policy controls may include patch level(s), firewalls and/or antivirus software. Other restrictions may be based on authentication of identification and/or specific addresses. The addresses may include media access control (MAC) addresses and/or Internet Protocol (IP) addresses. The method may include MAC Authentication Bypass (MAB).

The method may include utilizing centralized Authentication, Authorization and Accounting (AAA) management. The method may include one or more than one networking protocol. The method may include Remote Authentication Dial-In User Service (RADIUS). The method may include 802.1x Port-Based NAC. IoT device(s) may submit authentication request(s) to switch(es) for translating (e.g. into RADIUS requests) and/or relaying to one or more than one authentication server. The IoT request(s) may be sent using Extensible Authentication Protocol over LAN (EAPOL). IoT device(s) may receive network identifiers(s). The receipt of the identifier(s) may be upon authentication. Alternatively, or additionally, the IoT device(s) may be segmented to isolated network(s) and/or denied access to network(s)/segment(s). The method may include dynamic VLAN assigning to the IoT device(s).

The method may include ensuring compliance with predetermined enterprise security policies. The method may include patch scanning. The method may include anti-virus scanning. The method may include monitoring the enterprise network for MAC and IP pairs. The method may include transmission of one or more than one notification. The notification(s) may include one or more than one alert. The alert(s) may notify of detected abnormal network activity.

The method may involve hardware and/or software configured to perform one or more monitoring processes of network device(s) and/or traffic. The method may include duplicating enterprise network traffic. The method may include mirroring switch ports. The method may involve one or more than one network tap. The method may involve one or more than one data loss prevention (DLP) tool. The method may include isolating compromised segment(s) of the enterprise network.

The method may include analyzing segment ports. The method may include analyzing segment applications. The method may include analyzing segment protocols.

The IoT device(s) may be segmented based on associated IoT device security need(s). The IoT device(s) may be segmented based on associated IoT device function(s).

The methods may include, and the apparatus may involve, a method for facilitating electronic communication between one or more than one IoT device and one or more than one system. The communication may be secure. The communication may be mediated by one or more than one network.

The IoT device(s) may be generic and/or configured for general use. The IoT device(s) may be specialized for enterprise function(s). The IoT device(s) may include one or more than one enterprise internet-of-things (EIoT) device. The IoT device(s) may include one or more than one virtual device. The IoT device(s) may include one or more than one physical device.

The system(s) may be generic and/or configured for general use. The system(s) may be specialized for enterprise function(s). The system(s) may include one or more than one enterprise system.

The network(s) may include one or more than one enterprise network. The network(s) may be secure. The enterprise network(s) may be secure. The network(s) may include one or more than one secure subnetwork. The secure subnetwork(s) may include the enterprise network(s). The network(s) may include the system(s). The network(s) may include one or more than one insecure subnetwork, such as the internet.

The method may include utilizing one or more than one layer of data processing. The layer may include one or more steps and/or processes. The steps may be manual and/or automatic.

The method may include using one or more than one identification layer. The identification layer may include identifying the device(s). The identification layer may include identifying one or more protocols associated with the device(s). The identification layer may include identifying one or more protocols of the device(s). The identification layer may include identifying a user.

The user may include an administrator of the network. The user may include an administrator of the system. The user may include an enterprise employee. The user may include an enterprise associate. The user may include an enterprise client and/or customer.

The method may include using one or more than one translation layer. Functioning of the translation layer may include translating of data. The data may include the protocols. The data may include the communication. The data may include a plurality of communications between the device and the system. The data may include the identified protocols. The translating may facilitate communication between the IoT device(s) and the enterprise system. The translating may enable the communication(s). The translating may be based on the identified EIoT device protocols. The translating may be executed to conform to requirements of the system. The translating may be executed to conform to requirements of the EIoT device. The translating may include emulating. The translating layer may include one or more than one virtual machine.

The method may include using one or more than one authentication layer. Functioning of the authentication layer(s) may include locking the enterprise network/system(s) down to one or more than one predetermined type of communication with the IoT device(s), such as identified EIoT device(s). Functioning of the authentication layer(s) may include designating type(s) of allowed communication(s) with the IoT device(s). Functioning of the authentication layer(s) may include restricting the network/system(s) to the communication type(s). The restricting may be executed via a gateway that factors EIoT device characteristic(s) and/or network segment function(s).

The allowed communication type(s) may depend on involved network/system segment(s). The involvement of the segment(s) may include/involve access to the segment(s). The communication type(s) may include/involve access to enterprise subsystems. The segment(s) may include the accessible subsystem(s). The communication type(s) may include/involve access to control of enterprise subsystems, such as climate control, security and/or data storage subsystems. The communication type(s) may include/involve access to enterprise data. The data may include restricted and/or sensitive information. The data may include public and/or non-sensitive information.

The methods may include, and the apparatus may involve, a method for facilitating secure electronic communication between the IoT device and the enterprise system. The communication may be over the enterprise network.

The method may include segmenting of the network and/or system into a plurality of segments. The method may include micro-segmenting of the enterprise network into defined network segments. One or more than one of the network segments may be associated with one or more than one distinct segment function. Each of the segments may be associated with one or more than one of a plurality of segment functions. Each of the network segments may be distinctly associated with one or more than one of the segment function(s).

The method may include determining presence of one or more than one of the IoT device(s). The IoT device(s) may be and/or have been unsecured. The IoT device(s) may be associated with one or more than one unsecured network, such as the internet and/or an unsecured internal enterprise network. The IoT device(s) may be associated with one or more than one secure network.

The method may include identifying one or more than one of the IoT device(s). The method may include identifying one or more than one type of the IoT device(s). The device type(s) may include one or more than one characteristic. The method may include identifying the device characteristic(s). The characteristic(s) may be functional. The characteristic(s) may indicate one or more functions of the device. The device function(s) may include device functionality(ies). The characteristic(s) may correspond to one or more than one of the segment function(s). The device type(s) may be associated with the device function(s). The device type(s) may be associated with the communication type(s). The identifying of the device may include the identifying of the device type(s). The device type may be associated with use(s) of the device(s). The device type may be associated with user(s) of the device(s). The device type may be associated with security level(s) of the device(s). The device type(s) may be associated with the network/segment function(s). Illustrative classes, types and/or functions of IoT devices and/or of associated network segment(s) are shown in Table 1.

TABLE 1

Illustrative Classes, Function/Functionality, and/or Types of Enterprise IoT Devices, Systems and/or Network Segments.

Data Monitoring
Automation
Management
Provisioning
Operation Optimization
Workflow Management
Supply Chain Management
Warehouse Management
Surveillance
Security Monitoring
Data Collection
Mobile Device Management
Facility Management
Asset Management
Predictive Maintenance
Fleet Management
Telematics
Healthcare
Retail
Smart Automobile System
Smart Automated Teller Machine
Smart Watch
Smart Glasses
Smart Phone
Smart Thermostat
Smart Sprinkler System
Security System
Smart Concession Stand/Dispenser
Security Camera Control
Smart Lighting System
Emergency Response Contact System
Biometric Devices The identifying of the characteristic(s) may include detecting a plurality of characteristics. The characteristic(s) may correspond to a plurality of segment functions. The identifying of the characteristic(s) may include detecting a first characteristic. The first characteristic may correspond to a first of the segment functions. The identifying of the characteristic(s) may include detecting a second characteristic. The second characteristic may correspond to a second of the segment functions.

The method may include the identifying of the protocols of the IoT device(s). The method may include the translating/emulating of the IoT device protocols for the communication with the enterprise system.

The method may include electronically quarantining the IoT device. The quarantining may include physical isolation. The quarantining may include virtual isolation. The isolated segment may include one or more than one isolated network. The quarantining may be to an isolated network segment. The isolated segment may be configured to prevent access by quarantined device(s) of sensitive enterprise systems. The isolated segment may include one or more than one firewall. The isolated network may include one or more than one virtual network. The isolated network may include one or more than one physical network. The method may include electronically quarantining the quarantined EIoT device in the isolated network segment from an application previously quarantined in the isolated network segment.

The method may include one or more than one determination of one or more than one of the function(s) associated with the IoT device. The determination may be based on data associated with the IoT device. The data may include the device type. The data may include the device function. The data may include device functionality. The data may include any suitable data for determining the function(s)/functionality of the device. The determination may be for routing the device to one or more of the defined segments associated with the function.

The method may include providing one or more than one gateway. The gateway(s) may factor the communication(s) based on the function(s). The gateway(s) may factor the data based on the function(s). The data may include the communication(s). The gateway(s) may factor the data based on device specifications. The specifications may include the device type(s).

The method may include routing. The routing may be of the communication(s). The routing may be of the data. The routing may be to the segment(s). The routing may be from the segment(s). The routing may be based on the determined function(s). The routing may be to and from the segment based on the determined function(s).

The method may include determining if the IoT device is associated with a plurality of the functions. The method may include deconstructing the EIoT device. The method may include breaking down the data associated with the plurality of functions. The breaking down of the device data may facilitate the routing to each of the segments associated with each of the functions.

The method may include deconstructing the EIoT device into a first EIoT device component. The first EIoT device component may include the first characteristic. The method may include deconstructing the EIoT device into a second EIoT device component including the second characteristic.

The translating may include enabling the communication for the first component. The translating may include enabling the communication for the second component. The translating may include enabling the communication for both the first component and the second component. The communication type(s) may include a first communication type. The first communication type may correspond to the first component. The communication type(s) may include a second communication type corresponding to the second component. For example, one or more of the component(s) of the device(s) may be allowed access to one or more of the communication type(s) associated with one or more of the network segment(s), while other component(s) of the same device(s) may be denied access to the same communication type(s) associated with the same network segment(s).

The apparatus may involve, and the method may include, a method for securing electronic communication over an enterprise internet-of-things (EIoT) network. The method may include micro-segmenting the EIoT network into a plurality of segments associated with a plurality of functions. The segment(s) may include a first segment associated with a first of the functions. The segment(s) may include a second segment associated with a second of the functions. The second segment may be isolated from the first segment.

The method may include scanning for presence, on the EIoT network, of an EIoT device associated with an unsecured network. The method may include detecting the presence of the EIoT device. The scanning may be at regular and/or irregular intervals. The scanning may be manual and/or automated.

The method may include scanning for device data associated with the EIoT device. The method may include receiving the device data. The receiving of the device data may be from the device. The receiving of the device data may be from a network site. The receiving of the device data may be from any reliable transmitter of the device data. The device data may be stored in memory. The device data may be retrieved from the memory.

The method may include identifying the device data. The device data may include one or more than one functionality of the EIoT device.

The device data may include protocols of the EIoT device. The protocols may include the data. The identifying may be of the device protocols. The method may include translating the protocols to network-compatible form.

The method may include one or more than one determination of one or more than one correspondence of the device functionality(ies) with the segment function(s). The determination may be based on the device data. The determination(s) may include, for example, a correspondence of one functionality with a first of the functions and/or a lack of correspondence of the functionality with a second of the functions.

The method may include assigning the EIoT device to one or more of the segments. The assigning may facilitate information transfer involving the functionality. For example, an authorized and secured smart watch of an enterprise human resources employee may indicate a functionality corresponding to retrieving sensitive personnel data. Based on the functionality, the smart watch may be assigned and/or granted access to a segment including secure enterprise servers that have a designated function of securely storing the sensitive data. A remotely accessible vault thermostat may be denied access to the secure servers, based on detected functionality(ies) of the thermostat. Likewise, based on the assigning, the human resources smart watch may be denied access to a remotely accessible controller of the thermostat. The controller may instead be, e.g., manually accessed via authorized and authenticated tablet-device(s) of authorized enterprise employee(s) and/or automatically accessed by secured vault sensor(s)/thermometer(s). The tablet-device(s) and/or sensor(s) may indicate functionalities corresponding to the function(s) of maintaining conditions of enterprise vault(s). The tablet-device(s) and/or sensor(s) may be assigned to network segment(s) associated with maintaining the conditions of enterprise vault(s).

The method may include allowing the information transfer between the EIoT device(s) and the segment(s). The allowing may include facilitating the information transfer between the EIoT device and the segment(s). The allowing may include enabling the information transfer between the EIoT device and the segment(s). The allowing may include routing the information transfer between the EIoT device and the segment(s). The allowing may be based on the assigning. The allowing may include the translating.

The method may include blocking the information transfer between the EIoT device(s) and the segment(s). The method may include blocking the information transfer between a first set of the EIoT devices and a first set of the segments. The method may include allowing the information transfer between a second set of the EIoT devices and the first set of the segments.

The blocking may include quarantining the EIoT device. The quarantining may be electronic. The quarantining may be virtual. The quarantining may be physical. The quarantining may involve one or more than one isolated network segment. The isolated network segment(s) may include one or more than one virtual network. The isolated network segment(s) may include one or more than one physical network.

The method may include determining that one or more than one additional functionality of the EIoT device corresponds with one or more than one of the plurality of functions. The method may include performing one or more than one assignment of the EIoT device to one or more than one of the segments. The one or more than one segment may be associated with the corresponding function. The assignment may enable information exchange involving the additional functionality(ies).

The method may include allowing of the information exchange between the EIoT device and the segment(s). The allowing may include enabling of the information exchange. The allowing may include facilitating of the information exchange. The allowing may include routing of the information exchange. The allowing may include the translating. The allowing may be based on the assignment.

The method may include electronically isolating the quarantined EIoT device in the isolated network segment from an application previously quarantined in the isolated network segment. The isolating may prevent communicated infection between the quarantined EIoT device and the previously quarantined application. The isolating may include segmenting of the isolated network segment.

The apparatus may include, and the methods may involve, a non-transitory computer-readable medium comprising program code. The program code may include machine-readable instructions for instructing a processor to perform one, some or all steps of the method(s).

The apparatus may include, and the methods may involve, one or more than one communication system architecture. The system architecture may include an EIoT secure communication system.

The system architecture may include one or more than one of the IoT device(s). The system architecture may include one or more than one enterprise system. The enterprise system may include one or more than one processor. The enterprise system may include one or more than one network. The network may include software and/or hardware connections between the system and the EIoT device.

The enterprise system may include one or more than one medium. The medium may be configured to store the program code. The medium may be transitory. The medium may be non-transitory. The medium may be computer-readable. The medium may store the program code. The medium may include one or more than non-transitory, computer-readable memory storing the program code. The program code may include machine-readable instructions for instructing the processor to facilitate secure electronic communication over the network connections.

The system architecture may include one or more than one electronic input device. The system architecture may include one or more than one output device. The input device(s) and/or the output device(s) may include one or more than one input and/or output (I/O) feature configured for performing the one or more steps of the method. The I/O feature(s) may include hardware. The I/O feature(s) may include software. The I/O feature(s) may be dedicated to the performing of the step(s). The feature(s) may be exclusively dedicated to the performing of the step(s).

The performing of the step(s) may be mediated by the I/O feature(s). The performing of the step(s) may include facilitating the step(s). The performing may include enabling the step(s). The performing may include executing the step(s). The performing may include initiating the step(s). The performing may include completing the step(s).

The I/O feature(s) may include one or more than one electronic display. The display(s) may include visual display(s), such as array(s) of light-emitting diodes (LEDs). The LEDs may include organic light-emitting diodes (OLEDs). The display(s) may include auditory display(s), such as speakers. The display(s) may be controlled by the processor(s). The I/O feature(s) may include one or more than one touchscreen, keyboard, mouse and/or any suitable input device. The I/O feature(s) may be in electronic communication with the processor(s).

The memory(ies) may store program code including machine-readable instructions for instructing the processor to present a user interface(s) (UI). The UI may include one or more than one graphic user interface (GUI). The UI may include the feature(s). The UI may be presented in a sequence. The memory(ies) may store program code including machine-readable instructions for instructing the processor to present, via the display, the UI including the feature(s) configured for performing the step(s) via the input device(s).

FIG. 1 shows illustrative system architecture 100. Architecture 100 may represent an internet of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include one or more than one node. Each node may include two or more nodes. FIG. 1 shows exemplary nodes 101, 103, 105, 107 and 109. Architecture 100 may include sensors 103. Sensors 103 may include one or more than one sensor. Sensors 103 may include device(s) that detect changes in a physical or virtual environment. For example, sensors 103 may measure audio, rainfall, temperature and/or water levels. Sensors 103 may measure electronic network traffic, electronic signals (e.g., input or output) and/or frequency of user logins from within a predefined geographic area.

Sensors 103 may be of any suitable size(s). For example, sensors 103 may be a few millimeters in size. Sensors 103 may be deployed in a wide variety of locations. For example, sensors 103 may be deployed in military battlefields, industrial plants, in orchards, in clothing, automobiles, smart phones, jewelry, consumer packaged goods (CPG), CPG dispensers, enterprise warehouses, offices, storage units, vaults, safes, pipes, ducts, conduits, or refrigerators. Sensors 103 may be relatively inexpensive and have low energy consumption. Sensors 103 may be configured to "sense" two or more stimuli or environmental changes.

Sensors 103 may implement one, two or more functions. For example, sensors 103 may measure changes in the native environment of sensors 103, capture data related to the measured changes and/or store and/or communicate the captured data. Sensors 103 may be accessed by other sensors and/or any other node. Sensors 103 may transmit captured data to another node. Sensors 103 may broadcast captured data to two or more nodes.

The captured data may be transmitted using any suitable transmission method. For example, data captured by a sensor may be extracted by a mobile phone. Sensors 103 may leverage a communication link provided by a mobile phone to communicate captured data to another node.

Each sensor may be a node and each sensor may be assigned a unique identifier. For example, sensors 103 may be identified by one or more radio frequency identification ("RFID") tags. The RFID tag may be stimulated to transmit identity information about the sensor or any other information stored on the RFID tag.

The captured data may be transmitted by the sensor. The captured data may be processed far from the location of the sensor that captured the data. For example, captured data may be transmitted from one node to another node until the captured data reaches data repository 101.

Sensors 103 may be positioned and/or capture data from diverse locations. The locations may include geographic locations or virtual locations on electronic networks. The captured data may be transmitted to a location where information is needed for decisioning or consumption, which may not be the same place the data was captured or generated. Data synchronization protocols and caching techniques may be deployed to ensure availability of information at, and/or delivery to, a desired node. For example, a location where data is captured may not have continuous reliable network connectivity. Accordingly, the captured data may be stored locally on the sensor for an amount of time prior to transmission or broadcast to another node.

Contextually, the captured data may provide information not only about the physical environment surrounding a sensor. The capturing of data from one or more of sensors 103 may provide data that signifies an event. Sensors 103 may be grouped. Sensors 103 may be grouped based on physical proximity or based on the content (or expected content) of data captured. Sensors 103 may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention and/or with limited human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry), smart home/office devices (e.g., lighting, alert systems, sprinkler systems, temperature control systems, surveillance/security systems), mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or be operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM"); authorize access to and/or modify stored data and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available. The present invention provides solutions to these problems.

Apparatus and methods of the present invention may include and/or involve micro-segmentation of an enterprise network to facilitate secure communication between an enterprise system and connected enterprise internet-of-things (EIoT) devices. The enterprise network may include the enterprise system. The enterprise network may include the EIoT devices. The enterprise system may include the EIoT devices. Architecture 100 may include the network. Architecture 100 may include the enterprise system. The EIoT devices may include actuators 107. The EIoT devices may include sensors 103.

Generally, nodes of architecture 100 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), REpresentational State Transfer ("REST") Constrained Application Protocol ("CoAP") or SensorML.

As a result of the disparate nature of sensors 103, an architecture, such as architecture 100 incorporating sensors 103 may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry cell batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
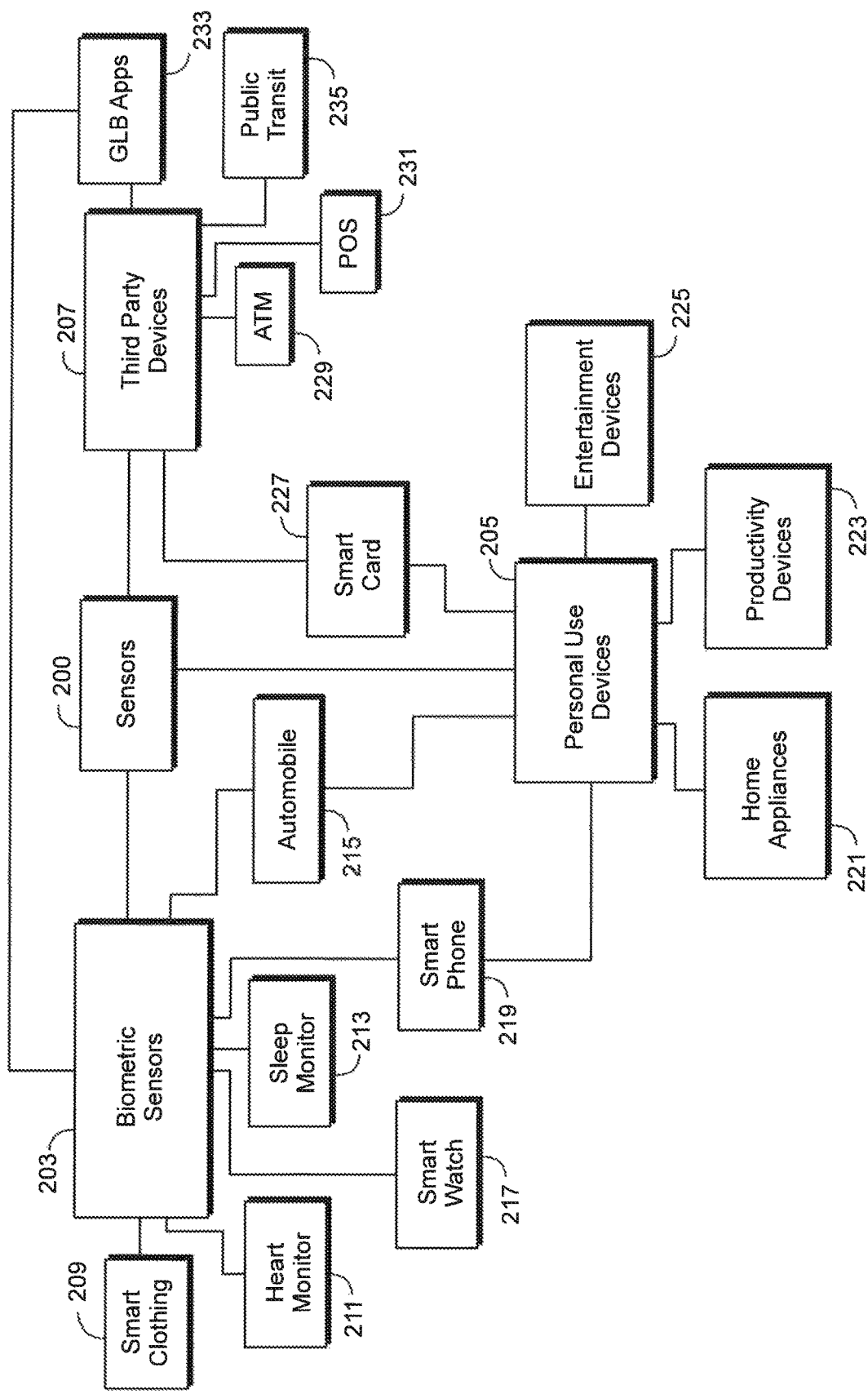
FIG. 2 is a schematic diagram of illustrative architecture in accordance with principles of the invention.

FIG. 2 shows illustrative sensors 200. Sensors 200 may include or more features of sensors 103 (shown in FIG. 1). Sensors 200 include biometric sensors 203 that sense biometric attributes. For example, biometric sensors, embedded in smart watch 217 and/or "smart" clothing 209, may monitor a wearer's physical condition(s). Such clothing may capture biometric data, such as pulse rate, temperature, muscle contraction, heart rhythm and physical movement. Smart clothing 209, and/or smart watch 217, may be linked to smart phone 219, such as via a Bluetooth® communication link. Smart phone 219, and/or smart watch 217, may transmit data captured by smart clothing 209, and/or by smart watch 217, to one or more other network nodes.

Biometric sensors 203 may include other illustrative sensors such as heart monitor 211, sleep monitor 213, smart watch 217, smart phone 219 and automobile 215.

Sensors 200 may include personal use devices 205. Personal use devices 205 may include sensors embedded in home and/or office appliances 221, productivity devices 223 or entertainment devices 225. Productivity devices 223 may include tablets, laptops or other personal computing devices. Entertainment devices may include gaming consoles and the like.

Sensors 200 may also include third-party devices 207. Third-party devices may include devices that are not under the direct or exclusive control of a user. A user may interact with third-party devices 207 to obtain a desired service provided by the third-party.

Exemplary third-party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229, point-of-sale terminals ("POS") 231 and public transit 235. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 2 shows that sensors may categorically overlap. For example, an application used to access an online bank portal may capture a biometric feature (e.g., fingerprint) to authenticate a user.

Each of the sensors shown in FIG. 2 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 μW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions disclosed herein may be used to verify an authenticity of data transmitted by sensors having disparate hardware and software capabilities.

Figure 3:
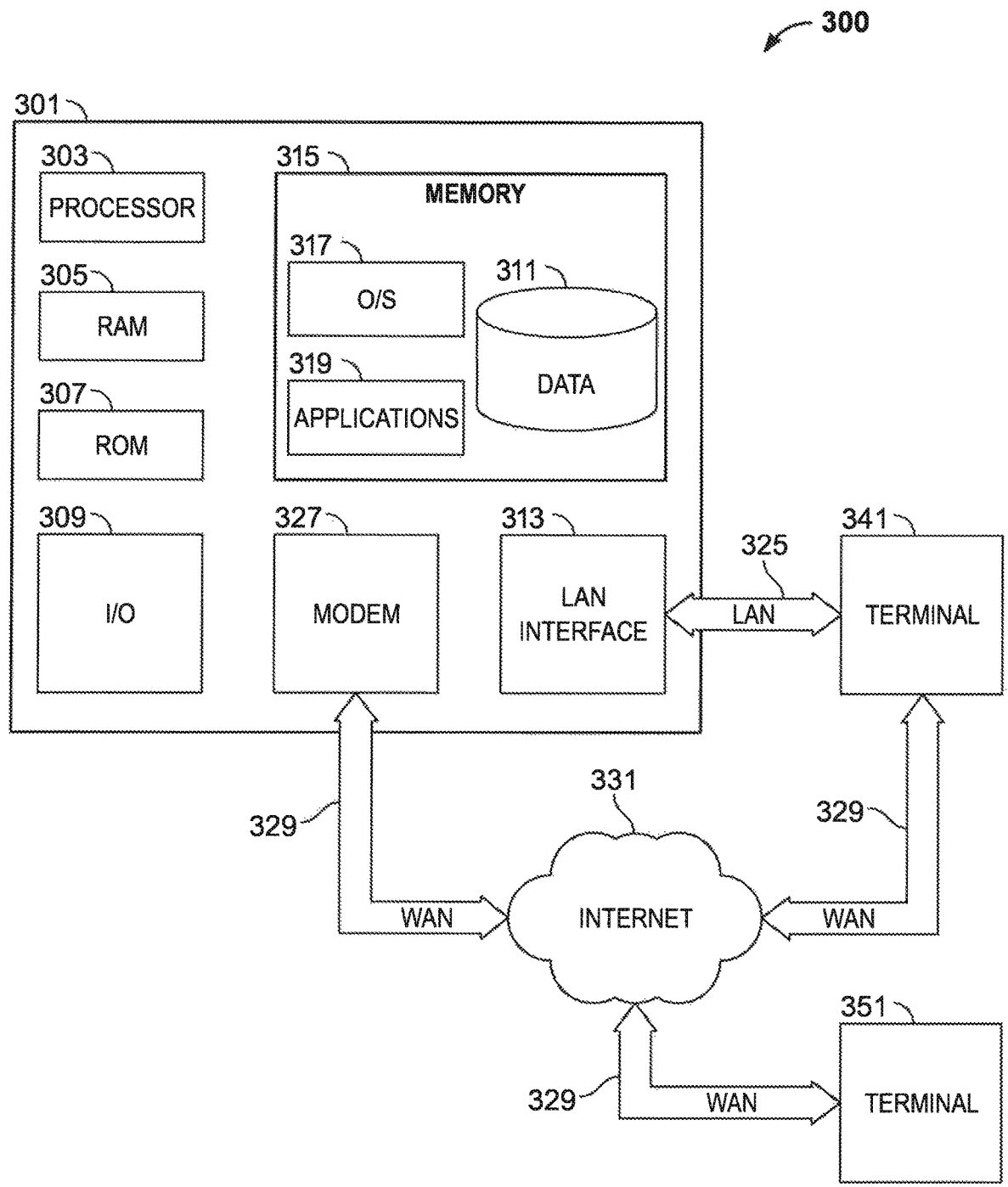
FIG. 3 is a schematic diagram of illustrative architecture in accordance with principles of the invention.

FIG. 3 is an illustrative block diagram of system 300. System 300 may include one or more features of the apparatus shown in FIGS. 1 and 2. System 300 includes computer 301. Computer 301 may include processor 303. Processor 303 may be configured for controlling operation of system 300. Processor 303 may be configured for controlling operation of associated components of system 300. Computer 301 may include may include RAM 305, ROM 307, input/output module 309, and memory 315. Processor 303 may execute software running on computer 301—e.g., operating system 317. Other components commonly used for computers such as EEPROM or Flash memory or any other suitable components may also be part of computer 301.

Memory 315 may be comprised of any suitable permanent storage technology—e.g., a hard drive. Memory 315 may store software, including operating system 317, application(s) 319, and/or data 311, needed for operation of system 300. Alternatively, or additionally, some or all of the computer-executable instructions may be embodied in hardware or firmware (not shown). Computer 301 may be configured to execute the instructions embodied by the software to perform various functions, such as the step(s) of the method(s).

Input/output ("I/O") module may include connectivity to a microphone, keyboard, touch screen, biometric scanner, sensor(s), camera(s) and/or stylus through which a user of computer 301 may provide input, and may also include one or more speakers for providing audio output and a video display device for providing textual, audiovisual and/or graphical output.

System 300 may be connected to other systems, e.g., via LAN interface 313.

System 300 may operate in a networked environment supporting connections to one or more remote computers, such as terminals 341 and 351. Terminals 341 and 351 may be personal computers or servers that include many or all of the elements described above relative to system 300. The network connections depicted in FIG. 3 include local area network (LAN) 325 and wide area network (WAN) 329, but may also include other networks. When used in a LAN networking environment, computer 301 is connected to LAN 325 through a LAN interface or adapter 313. When used in a WAN networking environment, computer 301 may include modem 327 or other means for establishing communications over WAN 329, such as Internet 331.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 319, which may be used by computer 301, may include computer executable instructions for invoking user functionality related to communication, such as email, Short Message Service (SMS), and voice input and speech recognition applications.

Computer 301 and/or terminals 341 and/or 351 may also include various other components, such as one or more than one battery, speaker, and/or antenna (not shown).

Terminal 351 and/or terminal 341 may include portable device(s) such as a laptop, cell phone, Blackberry™, smartwatch, smart-glasses or any other suitable device for storing, transmitting and/or transporting relevant information. Terminals 351 and/or terminal 341 may include other devices. These devices may be identical to system 300 or different. The differences may be related to hardware components and/or software components.

Figure 4:
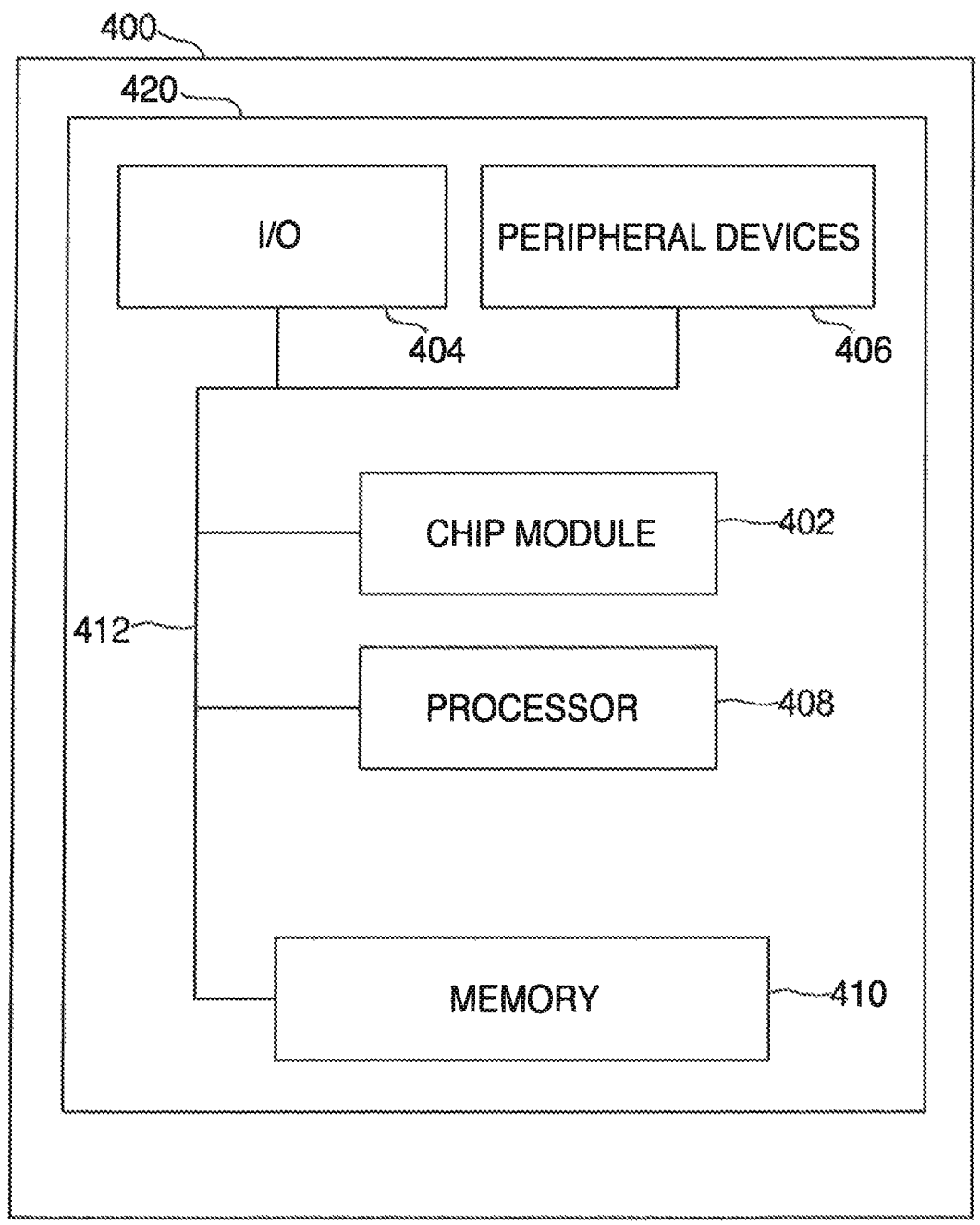
FIG. 4 is a schematic diagram of illustrative architecture in accordance with principles of the invention.

FIG. 4 shows illustrative apparatus 400. Apparatus 400 may be a computing machine. Apparatus 400 may include one or more features of the apparatus shown in FIGS. 1-3. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable encoded media or devices; peripheral devices 406, which may include counter timers, real-time timers, power-on reset generators or any other suitable peripheral devices; logical processing device 408, which may test submitted information for validity, scrape relevant information and/or aggregate data, and machine-readable memory 410 which may store data.

Machine-readable memory 410 may be configured to store in machine-readable data structures: information pertaining to a user, system, network and/or IoT device and/or any other suitable information or data structures.

Components 402, 404, 406, 408 and 410 may be coupled together by a system bus or other interconnections 412 and may be present on one or more circuit boards, such as 420. In some embodiments, the components may be integrated into a single chip. The chip may be silicon-based.

Figure 5:
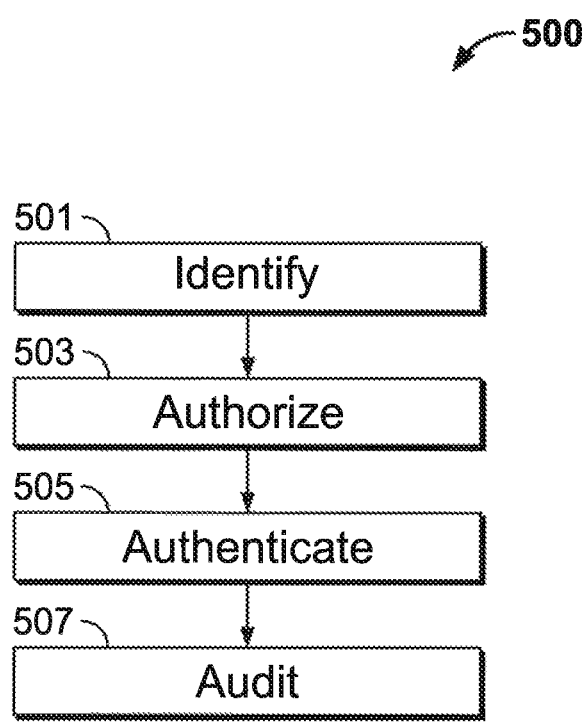
FIG. 5 is a schematic diagram of illustrative process(es) in accordance with principles of the invention.

FIG. 5 shows enterprise internet-of-things (EIoT) secure integration process 500. Process 500 may involve one or more features of the apparatus shown in FIGS. 1-4. One or more steps of process 500 may be performed by one or more of the apparatus shown in FIGS. 1-4. Process 500 may include a plurality of layers of processing. Process 500 may begin at step 501.

Step 501 may include identification of an internet-of-things (IoT) device for integrating into an enterprise system network. The identification of the IoT device may include identifying the device type and/or protocols.

At step 503, authorization level(s) for the IoT device(s) may be set. The authorization level(s) may be determined based on data associated with the IoT device, such as the identified device type. The authorization level(s) may include and/or involve access to functions of the enterprise system network, such as control of networked enterprise subsystems and/or access to stored enterprise data.

At step 505, the identity of the IoT device may be authenticated. Authorization for the access to the system functions may be dependent upon successful authentication of the IoT device. The authentication may be manual and/or automatic. The authentication may include and/or involve entry of one or more alphanumeric codes associated with the device identification. The authentication may include scanning of bar code(s) associated with the device, manual entry of serial numbers and/or any other suitable form of device authentication. Authentication of the IoT device may verify that identification credentials collected from the device are authentic.

At step 507, auditing of the enterprise system network and/or of connected IoT devices may be performed. The auditing may be manual and/or automated. The auditing may include analyzing IoT device behaviors. The auditing may include determining typical network behavior between and/or within segments of a micro-segmented system network, such as the enterprise system network. The auditing may include and/or involve machine learning. The auditing may include scanning for atypical network requests, such as by an integrated IoT device. The auditing may result in quarantining of an aberrantly behaving device.

Figure 6:
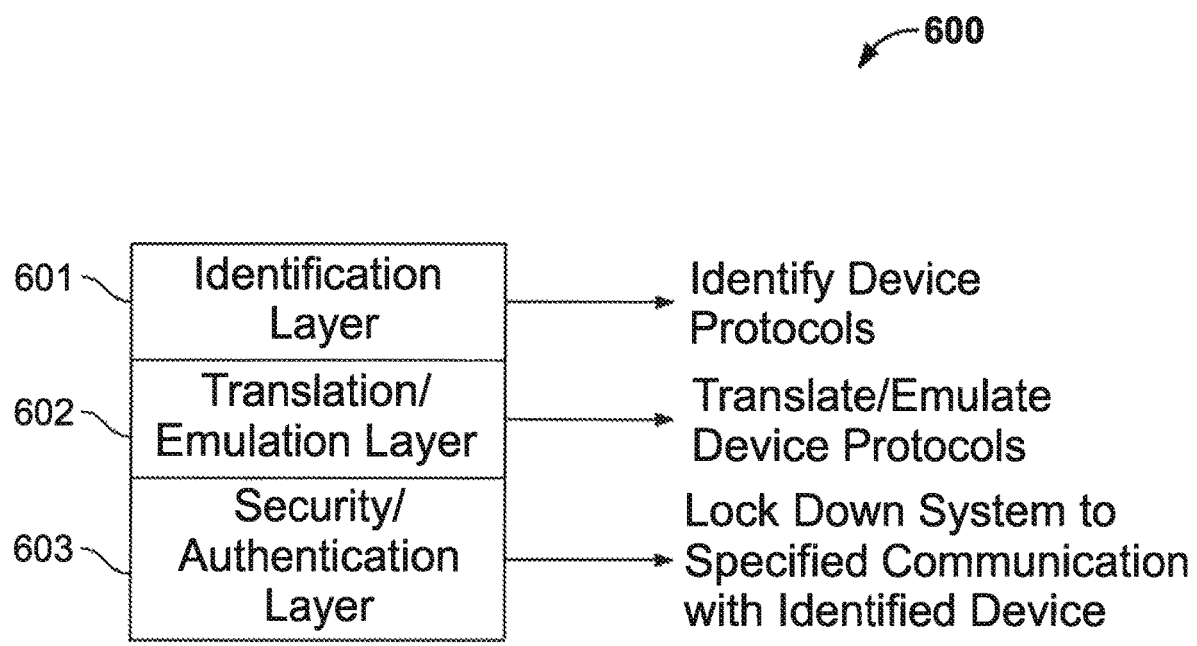
FIG. 6 is a schematic diagram of illustrative process(es) in accordance with principles of the invention.

FIG. 6 is a schematic diagram of enterprise IoT integration process 600. Process 600 may involve one or more features of the apparatus shown in FIGS. 1-4. One or more steps of process 600 may be performed by one or more of the apparatus shown in FIGS. 1-4. Process 600 may include one or more of the steps of process 500 (shown in FIG. 5). Process 600 may include a plurality of layers of processing. Process 600 may begin at step 601.

Step 601 may include an identification layer of processing. At step 601, one or more than one IoT device may undergo identification processes. A type and/or class of the device may be identified. Protocols of the device may be identified.

Step 602 may include a translation/emulation layer of processing. At step 602, the IoT device protocols may be translated and/or emulated for communication with an enterprise system.

Step 603 may include a security/authentication layer of processing. At step 603, the enterprise system may be locked down to a specified communication type with the identified IoT device. Micro-segmentation of the system may prevent unauthorized communication types between the identified device and the system.

Figure 7:
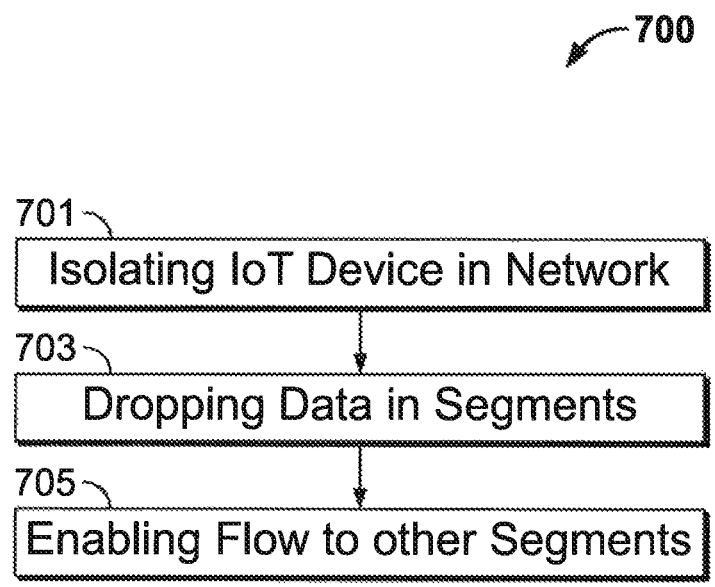
FIG. 7 is a schematic diagram of illustrative process(es) in accordance with principles of the invention.

FIG. 7 is a schematic diagram of enterprise IoT integration process 700. Process 700 may involve one or more features of the apparatus shown in FIGS. 1-4. One or more steps of process 700 may be performed by one or more of the apparatus shown in FIGS. 1-4. Process 700 may include one or more of the steps of processes 500 and 600 (shown respectively in FIGS. 5 and 6). Process 700 may include a plurality of layers of processing. Process 700 may begin at step 701.

Step 701 may include quarantining of an IoT device in an enterprise network system. The quarantining of the IoT device may prevent disruption of the network system by incompatible and/or malicious code. The quarantining of the device may prevent malicious use of the device as a backdoor into the system. The quarantining of the device may enable delaying of access to the system by the device until preventative measures have been implemented to avoid harm to the system by the device. The measures may include allocating device communications to a specified network segment based on an identified device class. The measures may include translating device protocols for the system.

Step 703 may include organizing network data into segments, as a micro-segmented network. Segment-specific security policies may be assigned to connected IoT devices and device applications, based on IoT device functions. IoT devices with functions unrelated to a specific set of network segments, may be prevented from communicating with those segments.

Step 705 may include facilitating regulated data flow between network segments. Communication between the segments may be limited to specified types of communications based on likelihood of non-maliciousness of the communication. The likelihood may be determined using machine learning processes and/or analyses to detect patterns of typical types of communication requests.

IoT device types and/or classes may be identified to determine specific functions associated with specific communication types and associated network segments. IoT device protocols may be translated and/or emulated for communication with the enterprise network. The enterprise system may be locked down to the specified communication type(s) with the identified IoT device(s) and associated network segment(s).

Figure 8:
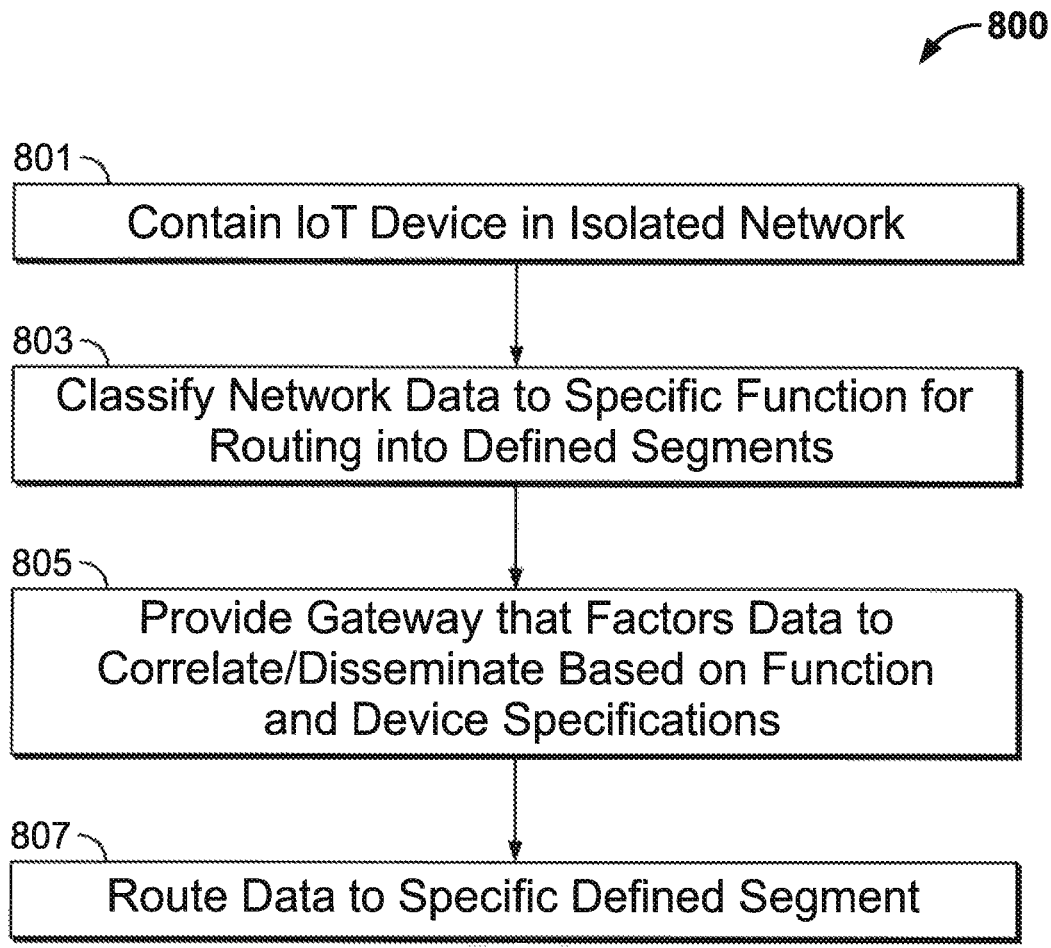
FIG. 8 is a schematic diagram of illustrative process(es) in accordance with principles of the invention.

FIG. 8 is a schematic diagram of enterprise IoT integration process 800. Process 800 may involve one or more features of the apparatus shown in FIGS. 1-4. One or more steps of process 800 may be performed by one or more of the apparatus shown in FIGS. 1-4. Process 800 may include one or more of the steps of processes 500, 600 and 700 (shown respectively in FIGS. 5, 6 and 7). Process 800 may include a plurality of layers of processing. Process 800 may begin at step 801.

Step 801 may include quarantining an IoT device to an isolated network. The quarantining of the IoT device may prevent disruption of an enterprise network system by incompatible and/or malicious code. The quarantining of the device may prevent malicious use of the IoT device as a backdoor into the enterprise system. The quarantining of the device may enable delaying of access to the system by the device until preventative measures have been implemented to avoid harm to the system by the device. The measures may include allocating device communications to a specified network segment based on an identified device class. The measures may include translating device protocols for the system.

Step 803 may include organizing network data into segments, as a micro-segmented network. Segment-specific security policies may be assigned to connected IoT devices and device applications, based on IoT device functions. IoT devices with functions unrelated to a specific set of network segments, may be prevented from communicating with those segments.

Step 805 may include providing a gateway that facilitates regulated data flow between network segments. The gateway may be virtual. The gateway may correlate IoT devices and network segments based on device functions and specifications. The gateway may disseminate network system data between IoT devices and network segments based on the device functions and specifications.

Communication between the IoT device(s) and/or network segment(s) may be limited to specified types of communications based on likelihood of non-maliciousness of the communication. The likelihood may be determined using machine learning processes and/or analyses to detect patterns of typical types of communication requests.

Communication of data between connected IoT device(s) and system network segment(s) may be dependent upon identified IoT device types and/or classes. The IoT device types and/or classes may determine specific functions associated with specific communication types and associated network segments.

IoT device protocols may be translated and/or emulated for communication with the enterprise network. The enterprise system may be locked down to the specified communication type(s) with the identified IoT device(s) and associated network segment(s).

At step 807, data communication between enterprise IoT device(s) may be routed to the previously designated and/or authorized network segment(s). The routing may depend on previously determined data associated with the device(s) and/or segments.

Figure 9:
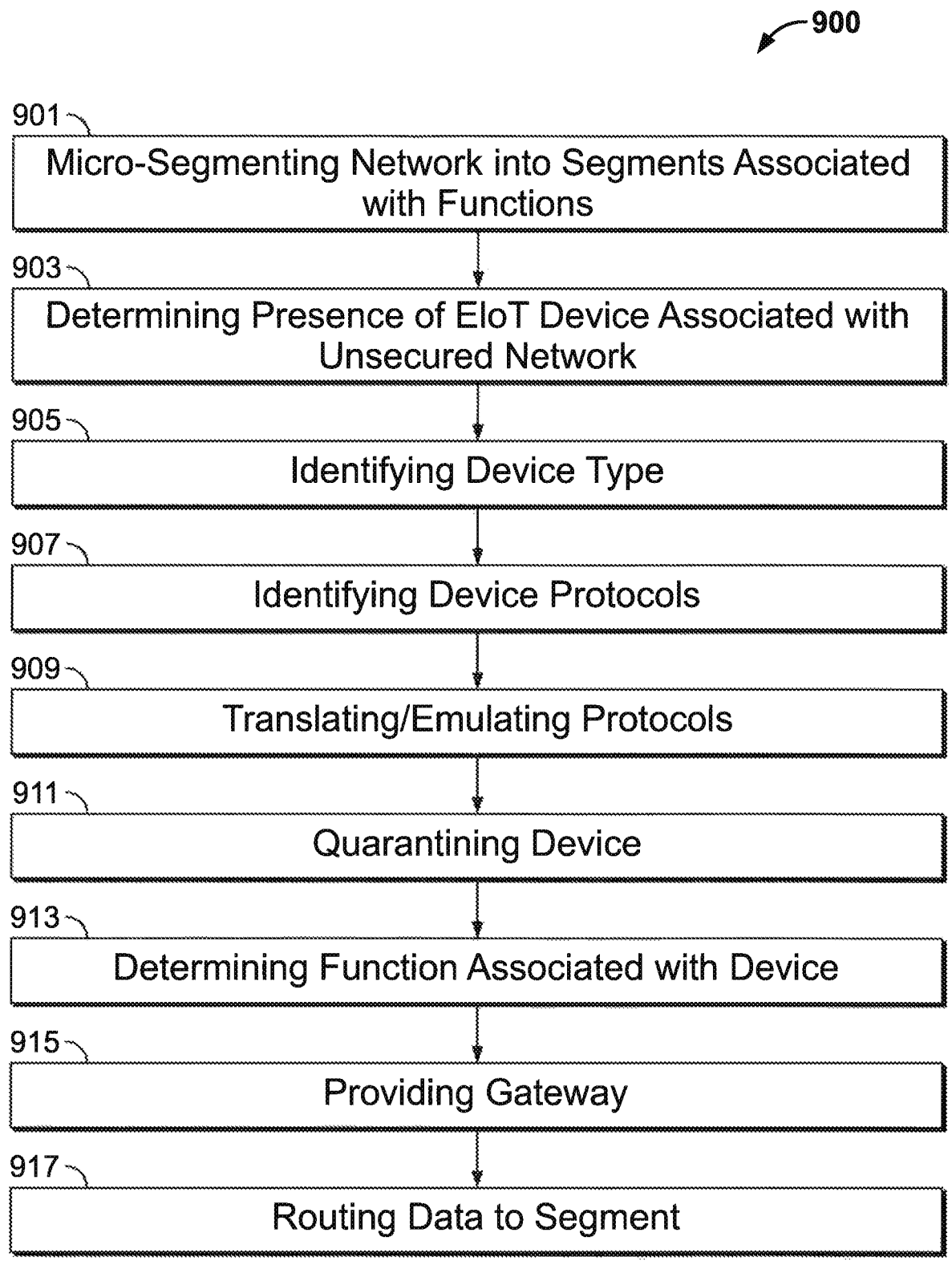
FIG. 9 is a schematic diagram of illustrative process(es) in accordance with principles of the invention.

FIG. 9 is a schematic diagram of enterprise IoT integration process 900. Process 900 may involve one or more features of the apparatus shown in FIGS. 1-4. One or more steps of process 900 may be performed by one or more of the apparatus shown in FIGS. 1-4. Process 900 may include one or more of the steps of processes 500, 600, 700 and 800 (shown respectively in FIGS. 5, 6, 7 and 8). Process 900 may include a plurality of layers of processing. Process 900 may begin at step 901.

Step 901 may include organizing enterprise network data into segments, as a micro-segmented enterprise network. Segment-specific security policies may be assigned to connected IoT device(s) and device application(s), based on IoT device function(s). IoT devices with function(s) unrelated to a specific set of network segment(s), may be prevented from communicating with those segment(s).

Step 903 may include a determination of presence of one or more than one IoT device on the network. The determination may include determining if the IoT device(s) has been connected to the enterprise network. The determination may include determining if the IoT device(s) is requesting access to the network. The determination may include determining if the IoT device(s) is and/or has been connected to an unsecured network(s), such as the internet.

At step 905, a type(s) and/or class(es) of the IoT device(s) may be identified. The type(s) and/or class(es) may be associated with IoT device function(s). The type(s) and/or class(es) may be associated with specific communication needs and specific type(s) of data. For example, a remotely accessible office environment controller(s), may have need to access office schedule(s), temperature sensor(s) and heating and cooling system(s), but should have no reason to access employee and/or enterprise associate data file(s). In contrast, data analyzing device(s) of enterprise personnel may require access to the data file(s).

At step 907, protocol(s) associated with the IoT device may be identified. The protocol(s) may be based on the specific language(s) and/or version(s) of the device(s).

At step 909, the IoT device protocol(s) may be translated for communication with the enterprise network. The translating may include emulation process(es) and/or function(s). The translating may facilitate effective communication between the IoT device and the enterprise network.

Step 911 may include quarantining an IoT device to an isolated network. The quarantining of the IoT device may prevent disruption of the enterprise network by incompatible and/or malicious code. The quarantining of the device may prevent malicious use of the IoT device as a backdoor into the enterprise network. The quarantining of the device may enable delaying of access to the network by the device until preventative measures have been implemented to avoid harm to the network by the device. The measures may include allocating device communications to a specified network segment based on an identified device class. The measures may include the translating of device protocols for the network.

At step 913, a determination may be made of one or more than one function associated with the identified IoT device(s) The determination may involve the use of one or more than one enterprise internal or external lookup table. The determination may be made based on device specifications. The specifications may include the device type and/or class. The specifications may include a version of the device. The function(s) may be associated with predetermined access level(s) to one or more of the network segments. The access level(s) may include access to some network segment(s). The access level(s) may prevent access to other network segment(s).

Step 915 may include providing a gateway(s) that facilitates regulated data flow between network segments. The gateway may be virtual. The gateway may correlate IoT device(s) and network segment(s) based on device function(s) and specifications. The gateway may disseminate network system data between IoT device(s) and network segment(s) based on the device function(s) and specifications.

Communication between the IoT device(s) and/or network segment(s) may be limited to specified type(s) of communications based on likelihood of non-maliciousness of the communication. The likelihood may be determined using machine learning processes and/or analyses to detect patterns of typical type(s) of communication requests.

Communication of data between connected IoT device(s) and system network segment(s) may be dependent upon identified IoT device type(s) and/or class(es). The IoT device type(s) and/or class(es) may determine specific function(s) associated with specific communication type(s) and associated network segment(s).

IoT device protocols may be translated and/or emulated for communication with the enterprise network. The enterprise network may be locked down to the specified communication type(s) with the identified IoT device(s) and associated network segment(s).

At step 917, data communication between enterprise IoT device(s) may be routed to the previously designated and/or authorized network segment(s). The routing may depend on previously determined data associated with the device(s) and/or segment(s).

Figure 10:
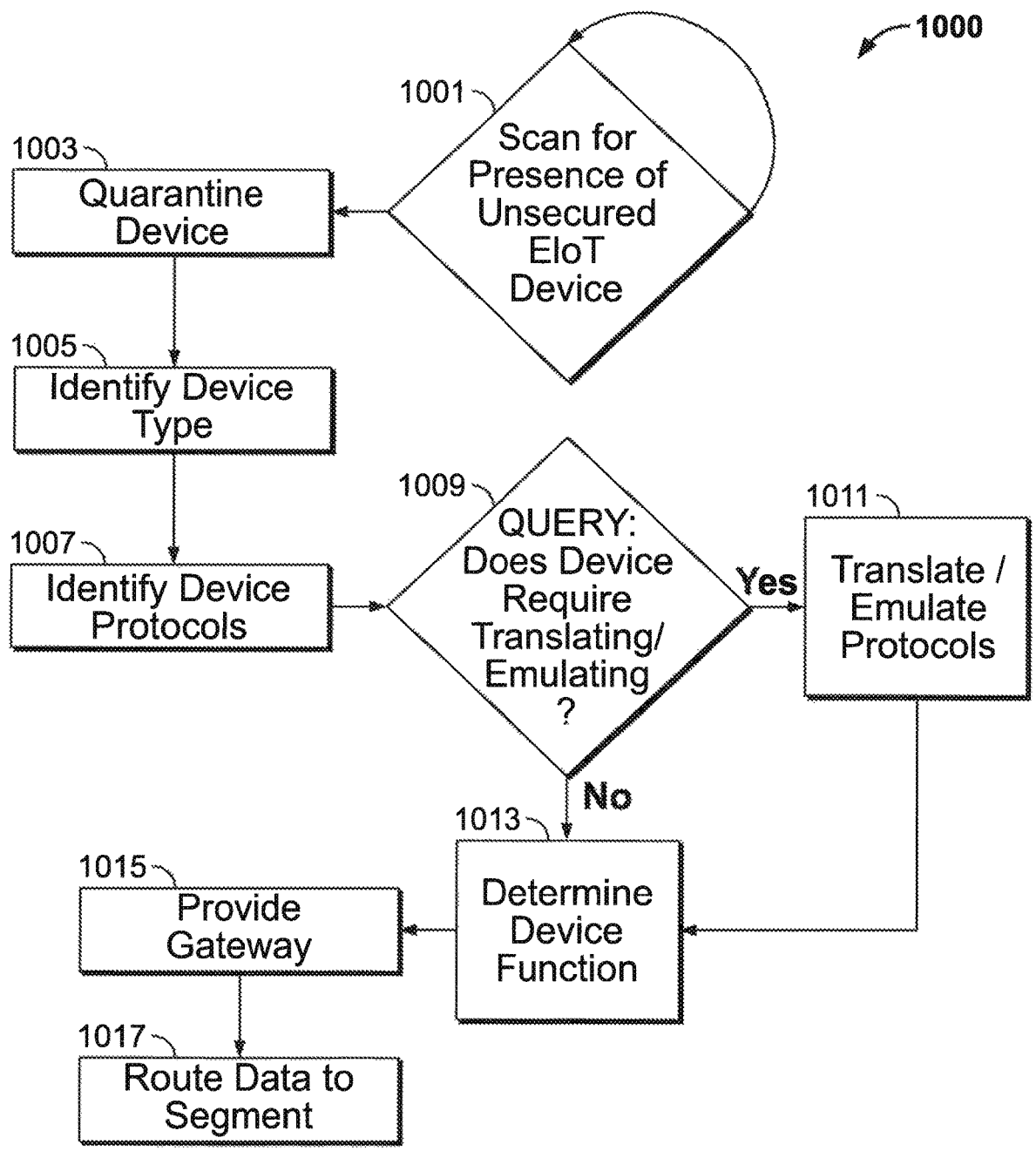
FIG. 10 is a schematic diagram of illustrative process(es) in accordance with principles of the invention.

FIG. 10 is a schematic diagram of enterprise IoT integration process 1000. Process 1000 may involve one or more features of the apparatus shown in FIGS. 1-4. One or more steps of process 1000 may be performed by one or more of the apparatus shown in FIGS. 1-4. Process 1000 may include one or more of the steps of processes 500, 600, 700, 800 and 900 (shown respectively in FIGS. 5, 6, 7, 8 and 9). Process 1000 may include a plurality of layers of processing. Process 1000 may begin at step 1001.

Step 1001 may include scanning an enterprise system network for presence of one or more than one IoT device. The network may micro-segmented based on predetermined network functions. The network functions may be associated with distinct security needs. The network functions may be associated with distinct device needs. The scanning may include determining whether connected IoT device have been updated. The scanning may include determining whether connected IoT device have been accessed from unsecured network(s) and/or device(s). The scanning may include a determination of the presence of the IoT device on the network. The determination may include determining if the IoT device(s) has been connected to the enterprise network. The determination may include determining if the IoT device(s) is requesting access to the network. The determination may include determining if the IoT device(s) is and/or has been connected to an unsecured network(s), such as the internet. The scanning may be repeated at regular and/or irregular intervals.

Step 1003 may include quarantining the IoT device to an isolated network and/or subnetwork. The quarantining of the IoT device may be configured to prevent disruption of the enterprise network by incompatible and/or malicious code. The quarantining of the device may be configured to prevent malicious use of the IoT device as a backdoor into the enterprise network. The quarantining of the device may be configured to enable delaying of access to the network by the device until preventative measures have been implemented to prevent harm to the network by the device. The preventative measures may include allocating device communications to a specified network segment based on an identified device class. The measures may include translating of device protocols for the network.

At step 1005, one or more than one class of the IoT device(s) may be identified. The class(es) may be associated with one or more than one IoT device function. The class(es) may be associated with specific communication needs and/or specific type(s) of network data.

At step 1007, one or more protocols associated with the IoT device may be identified. The protocol(s) may be based on specific language(s) and/or version(s) of the device(s).

At step 1009, a determination may be made whether the device(s) require translation and/or emulation processes to integrate with the enterprise system network. The determination may include analyzing specifications of the network and/or of component(s) of the network. The determination may include analyzing specifications of the device. The determination may include analyzing specifications of the device. The device specifications may include the device protocols. The determination may include comparing the network specifications with the device specifications.

At step 1011, upon a determination that the device(s) require translation/emulation, the IoT device protocol(s) may be translated for communication with the enterprise network. The translating may include emulation process(es) and/or function(s). The translating may include any suitable means for facilitating communication between the IoT device(s) and the enterprise network. Any suitable means may include virtual machines.

At step 1013, a determination may be made of one or more than one function associated with the identified IoT device(s). The determination may involve the use of one or more than one enterprise internal lookup table. The determination may involve the use of one or more than one external lookup table. The determination may be made based on device specifications. The specifications may include the device type and/or class. The specifications may include a version of the device. The function(s) may be associated with predetermined access level(s) to one or more of the network segments. The access level(s) may include access to some network segment(s). The access level(s) may prevent access to other network segment(s).

Step 1015 may include providing one or more than one gateway. The gateway(s) may facilitate regulated data flow between segments of the enterprise network. The gateway may be virtual. The gateway may correlate IoT device(s) and network segment(s) based on device function(s) and specifications. The gateway may disseminate network system data between IoT device(s) and network segment(s) based on the device function(s) and the device specifications.

Communication between the IoT device(s) and/or network segment(s) may be limited to specified type(s) of communications based on likelihood of non-maliciousness of the communication. The likelihood may be determined using machine learning processes and/or analyses to detect patterns of typical type(s) of communication requests.

Communication of data between connected IoT device(s) and system network segment(s) may be dependent upon identified IoT device type(s) and/or class(es). The IoT device type(s) and/or class(es) may determine specific function(s) associated with specific communication type(s) and associated network segment(s). The enterprise network may be locked down to the specified communication type(s) with the identified IoT device(s) and associated network segment(s). For example, climate control devices and/or controllers may be limited to communications determined to be related/necessary to climate control functions and may be restricted from access to other sensitive data At step 1017, one or more than one data communication may be routed between enterprise IoT device(s) and previously designated and/or authorized network segment(s). The routing may depend on previously evaluated requirements correlated between the device(s) and the segment(s).

Figure 11:
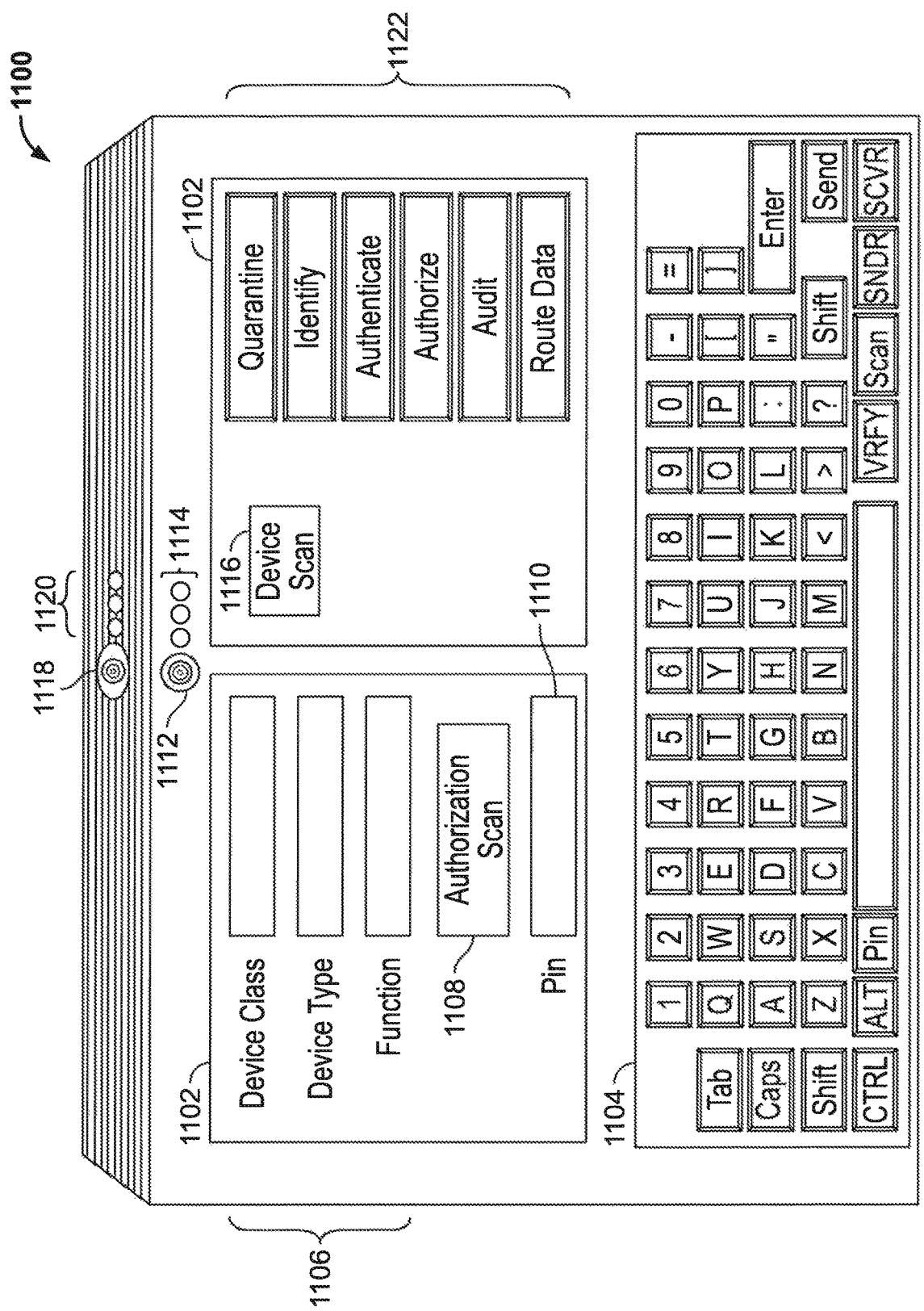
FIG. 11 shows a perspective view of illustrative apparatus in accordance with principles of the invention.

FIG. 11 shows enterprise internet-of-things (EIoT) device integrator 1100. Integrator 1100 may include one or more of the features of the apparatus shown in FIGS. 1-4. Integrator 1100 may be configured to perform one or more than one of the steps of processes 500, 600, 700, 800, 900 and 1000 (shown respectively in FIGS. 5, 6, 7, 8, 9 and 10). Integrator 1100 may be configured to perform a plurality of layers of processing. Integrator 1100 may be configured to perform secure integration of one or more than one IoT device into one or more than one enterprise network. The integration may be automated and/or manual. The integration may include machine learning. The integration may be supervised. The integration may include one or more than one of the steps of processes 500, 600, 700, 800, 900 and 1000.

Integrator 1100 may include one or more of input/output (I/O) features 1102 and/or 1104. Feature(s) 1102 and/or 1104 may enable a user to perform step(s) of the integration. Feature(s) 1102 and/or 1104 may include hardware configured to enable the user to perform the step(s). Feature(s) 1102 and/or 1104 may include software configured to enable the user to perform the step(s).

Feature(s) 1102 and/or 1104 may include one or more than one display. Feature(s) 1102 and/or 1104 may include one or more than one light emitting diode (LED). The LED(s) may include one or more than one organic light emitting diode (OLED).

Feature(s) 1102 and/or 1104 may include one or more than one depressible button and/or other suitable input features, such as a mouse (not shown). Feature(s) 1102 and/or 1104 may include one or more than one touchscreen. Feature(s) 1102 and/or 1104 may include one or more than one virtual button. Feature(s) 1102 and/or 1104 may include one or more than one widget.

Feature(s) 1102 may include data entry features 1106. Data entry feature(s) 1106 may be configured to prompt entry of IoT device and/or network data, such as device type, device class, device function and/or network segment function. The data may include device and/or network specifications. The data may include version(s) and/or protocols. Data entry feature(s) 1106 may be configured to display the data. Displaying of the data may be manual and/or automated.

Feature(s) 1102 may include data entry feature(s) 1108. Data entry feature(s) 1108 may be configured to prompt an authorization scan. Data entry feature(s) 1108 may be configured to execute the authorization scan. Data entry feature(s) 1108 may be configured to activate one or more than one of authorization scan hardware and/or software. The authorization scan hardware and/or software may be configured to perform the authorization scan.

The authorization scan may be configured to collect identifying data. The authorization scan may be configured to collect authorizing data. The authorization scan may be configured to collect authenticating data. The authorization scan may be configured to collect the identifying data from one or more than one user. The authorization scan may be configured to collect the authorizing data from the user(s). The authorization scan may be configured to collect the authenticating data from the user(s). The authorization scan may be configured to collect the identifying data from one or more than one device. The authorization scan may be configured to collect the authorizing data from the device(s). The authorization scan may be configured to collect the authenticating data from the device(s). The device(s) may include the IoT device(s).

Feature(s) 1102 may include data entry features 1110. Data entry feature(s) 1110 may be configured to prompt entry of the identifying, authorizing and/or authenticating data. The identifying, authorizing and/or authenticating data may include one or more than one identifier, password(s), certificate(s) alphanumeric code(s), device identification number(s), biometric information and/or personal identification number(s). Performance of one or more of the steps using integrator 1100 may be dependent upon successful authentication of the entered data. The performed step(s) may include the authorization scan.

Feature(s) 1104 may include one or more than one data entry feature, such as a keyboard, touchscreen, and/or virtual keyboard. Feature(s) 1104 may be configured to enable entry of the identifying, authorizing and/or authenticating data. Feature(s) 1104 may include hardware and/or software for performing one or more than one biometric scan, such as of fingerprint(s), signatures and/or behavioral pattern(s).

The authorization scan hardware may include authorization data collection feature 1112. Data collection feature 1112 may be configured to scan for the identifying, authorizing and/or authenticating data. Data collection feature 1112 may be integral to integrator 1100. Data collection feature 1112 may include one or more than one sensor. Data collection feature 1112 may include one or more than one microphone. Data collection feature 1112 may include one or more than one camera. Data collection feature 1112 may include one or more than one RFID scanner. Data collection feature 1112 may include one or more than one barcode scanner, such as a matrix barcode scanner.

Integrator 1100 may include status indicator(s) 1114. Indicator(s) 1114 may be configured to provide tactile, auditory and/or visual indications of a status of one or more of the steps. Indicator(s) 1114 may include one or more LEDs, microphones and or vibrating elements. The indication(s) may indicate the status of a stage of the step(s). The indication(s) may indicate that integrator 1100 is ready to perform one of the stage(s)/step(s). The indication(s) may indicate that performance of the stage(s)/step(s) has been initiated. The indication(s) may indicate that integrator 1100 has initiated the performance. The indication(s) may indicate that integrator 1100 is in the process of performing the stage(s)/step(s). The indication(s) may indicate that the performance has been completed. The indication(s) may indicate that integrator 1100 has completed the performance. The indication(s) may indicate that integrator 1100 is ready to receive the identifying, authorizing and/or authenticating data. The indication(s) may indicate that integrator 1100 is processing the identifying, authorizing and/or authenticating data. The indication(s) may indicate success of the identifying, authorizing and/or authenticating. The indication(s) may indicate failure of the identifying, authorizing and/or authenticating. Readiness, completion and/or success may be indicated, e.g., by a green light. Failure may be indicated, e.g., by a red light. Processing may be indicated by a yellow light. Indicator(s) 1114 may be positioned adjacent data collection feature 1112.

Feature(s) 1102 may include data entry feature(s) 1116. Data entry feature(s) 1116 may be configured to prompt the authorization scan. Data entry feature(s) 1116 may be configured to execute the authorization scan. Data entry feature(s) 1116 may be configured to activate one or more of the authorization scan hardware and/or software.

The authorization scan hardware may include authorization data collection feature 1118. Data collection feature 1118 may be configured to scan for one or more of the identifying, authorizing and/or authenticating data. Data collection feature 1118 may include one or more properties of data collection feature 1112. Data collection feature 1118 may be positioned in a second surface of integrator 1100. Data collection feature 1118 may be embedded in the second surface. The second surface may be orthogonal to the first surface. Data collection feature 1118 may be positioned to scan for the data from one or more than one of the IoT device(s) opposite a user accessing one or more of feature(s) 1102 and/or 1104.

Integrator 1100 may include status indicator(s) 1120. Indicator(s) 1120 may include one or more properties of status indicator(s) 1114. Indicator(s) 1120 may be positioned adjacent data collection feature 1118. Alternatively, or additionally, indicators 1120 may be positioned on the first surface. Indicator(s) 1120 and/or indicator(s) 1114 may be positioned in any suitable location for indicating the status.

Feature(s) 1102 may include process initiators 1122. Process initiators 1122 may enable the user to perform the step(s) of the integration. Process initiators 1122 may be configured to perform the step(s). Process initiators 1122 may include hardware configured to enable the user to perform the step(s). Process initiators 1122 may include software configured to enable the user to perform the step(s).

Process initiators 1122 may include one or more than one display. Process initiators 1122 may include one or more than one LED.

Process initiators 1122 may include one or more than one depressible button. Process initiators 1122 may include one or more than one touchscreen. Process initiators 1122 may include one or more than one virtual button. Process initiators 1122 may include one or more than one widget.

Thus, systems, architecture, methods and apparatus for secure integration of internet-of-things (IoT) devices into enterprise network(s) are provided. Persons skilled in the art will appreciate that the present invention can be practiced by other than the described embodiments, which are presented for purposes of illustration rather than of limitation, and that the present invention is limited only by the claims that follow.

What is claimed is:
1. A method for facilitating secure electronic communication between an enterprise intern-of-things (EIoT) device and an enterprise network system, the method comprising
    segmenting the system into a plurality of segments, the plurality of segments comprising a first segment associated with a first segment function and a second segment associated with a second segment function;
    using an identification layer, identifying;
        the EIoT device;
        a protocol of the EIoT device; and at least one characteristic of the EIot device corresponding to a segment function associated with at least one of the plurality of segments;
using a translation layer, translating the communication based on the identified EIot device protocol to conform to requirements of the system; and
using an authentication layer, restricting the communication, via a gateway that factors the at least one EIoT device characteristic and the corresponding segment function, to at least one predetermined communication type with the identified EIoT device, the communication type corresponding to the at least one system segment; wherein:
the identifying of the at least one characteristic includes:
detecting a first characteristic corresponding to the first segment function; and
detecting a second characteristic corresponding to the second segment function;
the method further includes:
deconstructing the EIoT device into:
a first EIoT device component including the first characteristic; and
a second EIoT device component including the second characteristic;
the translating includes enabling the communication for both the first component and the second component; and
the at least one communication type includes:
a first communication type corresponding to the first component; and
a second communication type corresponding to the second component.

2. A method for securing electronic communication over an enterprise internet-of-things (EIoT) network, the method comprising:
micro-segmenting the EIoT network into a plurality of segments associated with a plurality of functions including:
a first segment associated with a first function; and
a second segment associated with a second function, the second segment isolated from the first segment;
detecting presence, on the EIoT network, of an unsecured EIoT device;
identifying EIoT device data including a first functionality of the EIoT device and a second functionality of the EIoT device;
deconstructing the EIot device into a first EIoT device component comprising the first functionality and a second EIoT device component comprising the second functionality;
identifying a first protocol of the EIoT device associated with the first functionality of the EIoT device and a second protocol of the EIoT device associated with the second functionality of the EIoT device;
translating the protocols to network-compatible form;
determining, based on the device data:
a correspondence of the first functionality of the EIoT device with the first function;
a correspondence of the second functionality of the EIoT device with the second function; and
a lack of correspondence of the first functionality with the second function; assigning the EIoT device to the first segment for information transfer involving the functionalities;
based on the assigning and using the translating:
restricting information transfer between the EIoT device and the first segment to a first predetermined type of communication;
restricting information transfer between the EIoT device and the second segment to a second predetermined type of communication; and
blocking information transfer between the first component of the EIoT device and the second segment.

3. The method of claim 2 wherein the blocking includes electronically quarantining the EIoT device to an isolated network segment.

4. The method of claim 3 wherein the quarantining is virtual.

5. The method of claim 3 wherein the quarantining is physical.

6. The method of claim 3 further comprising:
electronically isolating the EIoT device quarantined in the isolated network segment from an application previously quarantined in the isolated network segment.

7. The method of claim 2 further comprising:
determining that a third functionality of the EIoT device corresponds with one of the plurality of functions;
performing an assignment of the EIoT device to at least one segment of the plurality of segments, the at least one segment associated with a corresponding function, the assignment for information exchange involving the third functionality; and
based on the assignment, allowing the information exchange between the EIoT device and the at least one segment.

8. The method of claim 2 wherein the EIoT device includes a virtual EIoT device.

9. The method of claim 2 wherein the EIoT device includes a physical EIoT device.

10. The method of claim 2 wherein the translating of the EIoT protocols includes emulating the EIoT protocols.

11. A method for facilitating secure electronic communication between an enterprise internet-of-things (EIoT) device and an enterprise network system, the method comprising:
segmenting the system into a plurality of segments, the plurality of segments comprising a first segment associated with a first segment function and a second segment associated with a second segment function:
using an identification layer, identifying:
the EIoT device;
a protocol of the EIoT device; and
at least one characteristic of the EIoT device corresponding to a segment function associated with at least one of the plurality of segments:
using a translation layer, translating the communication based on the identified EIoT device protocol to conform to requirements of the system; and
using authentication layer, restricting the communication, via gateway that factors the at least one EIoT device characteristic and the corresponding segment function, to at least one predetermined communication type with the identified EIoT device, the communication type corresponding to the at least one system segment; wherein:
the first segment function comprises control of networked enterprise subsystems and the second segment function comprises access to stored personnel data;
the EIoT first device characteristic comprises analysis of user login frequency within a predefined geographic area, the EIoT device characteristic corresponding to the first segment function; and the authentication layer is configured to restrict communication between the EIoT device and the enterprise system to a predetermined communication type comprising communication with the first segment to access subsystem network traffic data.

\* \* \* \* \*